United States Patent [19]
Gabel et al.

[11] 4,179,396
[45] Dec. 18, 1979

[54] SINGLE ADDITION ORGANIC-INORGANIC BLEND EMULSION BREAKING COMPOSITION

[75] Inventors: Robert K. Gabel, Houston, Tex.; William H. Lindenberger, Darien; Audrone M. Pavilcius, Chicago, both of Ill.

[73] Assignee: Nalco Chemical Company, Oak Brook, Ill.

[21] Appl. No.: 880,504

[22] Filed: Feb. 23, 1978

[51] Int. Cl.² ............................................. B01D 17/04
[52] U.S. Cl. .................................... 252/329; 252/330; 252/344; 252/358; 260/567.6 P
[58] Field of Search ............... 252/329, 330, 344, 358; 210/43, 54; 260/567.6 P, 584 B

[56] References Cited

U.S. PATENT DOCUMENTS

| | | | |
|---|---|---|---|
| 2,407,895 | 9/1946 | Monson et al. | 252/344 |
| 2,470,829 | 5/1949 | Monson | 252/344 X |
| 2,589,201 | 3/1952 | Monson | 252/329 |
| 3,141,905 | 7/1964 | Longley | 260/584 B X |
| 3,372,129 | 3/1968 | Phillips | 260/567.6 P X |
| 3,591,520 | 7/1971 | McDonald | 252/329 |

*Primary Examiner*—Benjamin R. Padgett
*Assistant Examiner*—E. Suzanne Parr
*Attorney, Agent, or Firm*—Richard L. Johnston

[57] ABSTRACT

Single addition organic-inorganic blend emulsion breaking compositions suitable for breaking oil-in-water emulsions are prepared which consist essentially of an aqueous solution of a water soluble acidic aluminum salt and a water soluble quaternized dehydration condensation polymer of triethanolamine or acylated triethanolamine, or mixtures of triethanolamine and acylated triethanolamine, said polymer containing tertiary amino groups of which 20–100% are quaternized.

18 Claims, No Drawings

SINGLE ADDITION ORGANIC-INORGANIC BLEND EMULSION BREAKING COMPOSITION

BACKGROUND

It is known in the art to break oil-in-water emulsions such as occur in industrial waste waters by adding thereto certain inorganic salts such as zinc chloride and certain types of organic polymers. The inorganic salts act as coagulant aids but heavy metal salts such as zinc chloride are objectionable from the environmental standpoint. Furthermore, the most effective organic polymers that have been employed in the past have been derived from raw materials which are not of uniform quality and hence are not a reliable type of material to provide consistent results.

When attempts are made to combine many of the prior art organic oil-in-water emulsion breaking compositions with an inorganic coagulant aid, a problem arises from the standpoint of compatibility which frequently requires the separate addition of the emulsion breaking organic material and the inorganic coagulant aid. It would be desirable, therefore, to provide a single addition organic-inorganic blend emulsion breaking composition in the form of an aqueous solution containing both the organic polymer and the inorganic coagulant aid dissolved therein so that the solution remains stable against precipitation of the components and at the same time shows excellent activity when used to break oil-in-water emulsions in industrial wastes.

Another disadvantage of some of the more effective emulsion breaking compositions in the past where the organic polymer and the coagulant aid have been combined has been their relatively high pH requirements of 8.5–10 which requires the user to make pH adjustments at the time of addition in the breaking of oil-in-water emulsions.

OBJECTS

With the foregoing considerations in mind, one of the objects of the present invention is to provide a new and useful single addition organic-inorganic blend emulsion breaking composition suitable for breaking oil-in-water emulsions in industrial wastes which avoids the use of objectionable heavy metal compounds.

Another object is to provide a composition of the type described having a special type of water soluble organic polymer and water soluble acidic aluminum salts dissolved therein and requiring minimum pH adjustment when utilized in the breaking of oil-in-water emulsions in industrial wastes.

Still a further object of the invention is to provide a composition of the type described which is relatively stable and remains so over a substantial period of time.

Another object is to provide a composition of the type described which is relatively non-corrosive against metals such as iron and steel and non-corrosive against stainless steel. Other objects will appear hereinafter.

BRIEF SUMMARY OF THE INVENTION

Single addition organic-inorganic blend emulsion breaking compositions suitable for breaking oil-in-water emulsions are prepared which consist essentially of an aqueous solution of a water soluble acidic aluminum salt and a water soluble quaternized dehydration condensation polymer of triethanolamine or acylated triethanolamine, or mixtures of triethanolamine and acylated triethanolamine, said polymer containing tertiary amino groups of which 20% to 100% are quaternized.

DETAILED DESCRIPTION OF THE INVENTION

A special type of water soluble organic polymer required for the purpose of the invention is prepared by the dehydration condensation with or without a catalyst of triethanolamine or acylated triethanolamine, or mixtures of triethanolamine and acylated triethanolamine. If catalysts are employed, it is preferable to use acidic condensation catalysts such as, for example, zinc chloride, ferric sulfate, aluminum chloride or certain inorganic acids such as sulfuric acid or orthophosphoric acid. If a catalyst is used the quantity employed is normally small usually within the range of 2%–4% by weight of the total charge.

If acylated triethanolamine is employed the acyl group is provided by long chain carboxy acids by adding to the triethanolamine compounds containing fatty acid radicals or other similar higher hydrocarbon radicals linked to one or more carboxy groups such as, for example, tall oil, cocoanut oil, or other substances containing fatty acids or other higher aliphatic carboxylic acids having 8 to 36 carbon atoms in hydrocarbon groups linked to carboxy groups. The quantity of the acylating component is preferably a minor quantity within the range of 0%–10% by weight of the total amount of triethanolamine and acylating component.

The reaction resulting in the formation of the dehydration condensation polymer is carried out by heating at a temperature sufficiently high and under conditions such that water is eliminated and removed from the reaction mixture. Usually, temperatures of 220°–280° C. are preferred and the process is carried out until a predetermined viscosity is reached short of gel formation. The temperature may vary depending upon the reactor and the volume of reactants. Aqueous condensate is removed continuously and the amount will also vary with different batches of raw material but will usually be within the range of 14%–30%.

The desired viscosity is usually reached within a period of 5–8 hours, depending upon the heating rate. In the early stages the viscosity will remain fairly low and constant. Once the viscosity starts to rise it will do so rapidly. A preferred viscosity for the polymer is a viscosity within the range of 44 to 164 centipoises at 190°–120° C., the viscosity being lower at the higher temperature and higher at the lower temperature.

When the proper viscosity is attained the reactor contents is allowed to cool to a temperature of 120° C. or less and water is added in amounts usually within the range of 20%–30% by weight of the total contents. The amount of water added is usually at least equal to the amount removed during the condensation and is sufficient to dissolve the polymer. Due to the nature of the reaction the polymer contains a plurality of tertiary amino groups which can be quaternized.

The quaternization is carried out preferably by adding a monoalkyl chloride such as, for example, methyl chloride, ethyl chloride, allyl chloride, or n-propyl chloride. Other quaternizing agents which can be employed are ethylene chlorohydrin, propylene chlorohydrin, butylene chlorohydrin, epichlorohydrin capped alcohols, epichlorohydrin capped monobasic organic acids, 3-chloro-2-hydroxy propyl trimethyl ammonium chloride, aralkyl halides such as benzyl chloride, or mixtures thereof, monoepoxides such as ethylene oxide, propylene oxide, butylene oxide, and the like, which can be added to form the corresponding quaternary hydroxides. Quaternary hydroxides can also be formed by displacing the quaternary halide with a strong base such as potassium hydroxide, sodium hydroxide, or silver oxide. In any case, the quaternizing component should be one which forms a water soluble quaternized dehydration condensation polymer of triethanolamine or acylated triethanolamine, or mixtures of triethanolamine and acylated triethanolamine. The degree of quaternization should be such that 20%–100% of the tertiary amino groups in the polymer are quaternized.

The resultant composition will usually have a pH within the range of 2–5 and, in any case, the pH should be such that when an acidic aluminum salt such as aluminum chloride or aluminum sulfate is added, the pH will be low enough to retain such salt in solution.

Using the procedure described above a preferred type of polymer is one prepared by heating 10,000 parts by weight of triethanolamine, 285 parts by weight of tall oil, and 250 parts by weight of zinc chloride at a temperature within the range of 220° C. to 230° C. until approximately 14%–17% by weight of the original charge is removed as condensate over a period of 5–8 hours until the resultant polymer has a viscosity within the range of 44–160 centipoises at 190°–120° C. This type of polymer is made by using 2%–4% by weight of tall oil. However, the tall oil can be eliminated. The zinc chloride catalyst can also be eliminated.

After the desired predetermined viscosity has been attained as previously described, the reactor contents are removed to a cold thinning kettle and when the temperature is dropped to about 120° C. water is added in amounts sufficient to dissolve the polymer, usually within the range of 14%–30% by weight. The quaternizing agent is then added and for the purpose of the present invention, methyl chloride is preferably employed in sufficient amount to completely quaternize all of the tertiary amino groups.

After the quaternization is complete, the aqueous solution of the quaternized polymer is mixed with the water soluble acidic inorganic aluminum salt, preferably aluminum sulfate or aluminum chloride.

The pH of the resultant composition is ordinarily within a range of 2–5 which pH the aluminum salt will remain in solution. The quantity of aluminum salt may vary but especially good results have been obtained where the resultant solution contains 10%–20% by weight quaternized polymer and 20%–30% by weight of either aluminum sulfate or aluminum chloride. The use of the aluminum sulfate is preferred because it is less corrosive.

The resultant single addition organic-inorganic blends are stable and remain stable over substantial periods of time.

A preferred blend is one containing 18% by weight of a quaternized polymer of the type previously described prepared from triethanolamine with 2%–4% tall oil 100% quaternized with methyl chloride and dissolved in the same amount of water eliminated during the formation of the polymer, blended with 48.2% by weight of a 50% by weight aqueous solution of alum and 33.8% additional water. This product has a viscosity of 8.82 centipoises, a pour point of 29° F., a cloud point of 22° F., a pH of 3.6 (in a 1% by weight solution), a specific gravity of 1.13, and a flash point greater than 200° F. Coupon corrosion of carbon steel in the liquid phase is 27 mils per year (mpy) and in the vapor phase 25 mpy. Coupon corrosion of 304 stainless steel in the liquid phase is 0.6 mpy and in the vapor phase 0.6 mpy.

Solutions containing 10, 20, 30, 40, 50 and 60 volume percent concentrations of the foregoing product in Chicago tap water are hazy brown in color with the haze being due to the nature of the product rather than any precipitation. All solutions were found to be stable during a 14-day stability test at room temperature, 40° F., and 110° F.

The product did not gel, crust or show any reaction on exposure to air, although after lengthy air drying it did lose its moisture content and become a brown crystalline solid.

In practical application the single addition organic-inorganic blend compositions of the present invention are added to industrial wastes containing oil-in-water emulsions at a pH such that the inorganic aluminum salt which acts as a coagulant aid will come out of solution. The optimum pH range at which this occurs is 5.5–8 which is within the range normally encountered in industrial wastes so that minimal pH adjustment of the industrial wastes is required prior to the addition of the organic-inorganic blend.

The dosage of the organic-inorganic blend required to break the oil-in-water emulsions normally found in industrial wastes can vary rather widely depending upon the particular type of industrial waste but is usually within the range of 10–3000 ppm.

Examples of industrial wastes to which the invention is applicable are those industrial wastes containing oil-in-water emulsions wherein the oil phase is either vegetable, animal or mineral, including wastes of the type produced in automotive manufacturing, steel manufacturing, machine operations, e.g., refined cutting oils, pickling, hydraulic mechanisms, rolling operations and lubricating operations, as well as in bakeries and other manufacturing operations where oily wastes are produced.

The invention will be further illustrated but is not limited by the following examples in which quantities are by weight unless otherwise indicated.

EXAMPLE I

A single addition organic-inorganic blend emulsion breaking composition was prepared which contained dissolved in water 18% quaternized triethanolamine of the type previously described and 18.6% $AlCl_3$, the remainder being water. This composition had optimum activity when applied to industrial wastes at a pH of 5.5–6.5, thus not requiring the pH adjustment to 8.5–10 necessary with commercial products available for the same purpose.

EXAMPLE II

A single addition organic-inorganic blend emulsion breaking composition was prepared containing 18% quaternized triethanolamine of the type previously described and 24% $Al_2(SO_4)_3$, the remainder being water. This composition had an optimum activity in breaking oil-in-water emulsions in industrial wastes at a pH of 7.5–8.2, thus not requiring the pH adjustment to 8.5–10 of a commercial emulsion breaker against which it was tested.

EXAMPLE III

The composition of Example I was effective when employed in breaking a milky, yellow, opaque emulsion in a storage sump pit resulting from manufacturing operations in a large manufacturing plant at an optimum dosage of 800 ppm and in a range of 800–1400 ppm at a pH of 7.5–8.

EXAMPLE IV

The composition of Example II was effective in breaking the milky, yellow, opaque emulsion referred to in Example III at an optimum dosage of about 1200 ppm and in a range of 1000 to 1400 ppm at a pH of 8.

EXAMPLE V

A 10% solution of the composition of Example I was effective in breaking a brown, opague emulsion which was an industrial waste derived from a large manufacturing plant at an optimum dosage of 500 ppm and a range of 300–1000 ppm at a pH of 6.5.

EXAMPLE VI

A 10% solution of the product of the single blend product of Example II was effective in breaking the brown, opaque emulsion of Example V at an optimum dosage of 600 ppm with a range of dosage from 300 to more than 1000 ppm at a pH of 7.

EXAMPLE VII

A 1% solution of the blend of Example I was effective in breaking a hazy, black emulsion containing free oil from a clarifier feed in a steel plant at an optimum dosage of 10 ppm and a pH of 5.6.

EXAMPLE VIII

A 1% solution of the blend of Example II was effective in treating industrial waste referred to in Example VII at an optimum dosage of 10 ppm and a pH of 5–6.

The foregoing examples serve to illustrate the practical application of the invention. It will be understood that the invention is equally applicable to the treatment of many other types of industrial wastes containing oil-in-water emulsions where the treatment involves breaking the emulsion and separating and recovering the oily waste material which normally forms on the surface of the liquid.

The invention has a number of important advantages in that it makes possible the removal and recovery of oily components from industrial wastes by using a single addition organic-inorganic blend emulsion breaking composition which requires minimal pH adjustment of the industrial wastes being treated and does not produce heavy metal contamination of the environment.

The invention is hereby claimed as follows:

1. A single addition organic-inorganic blend emulsion breaking composition suitable for breaking oil-in-water emulsions, said blend consisting essentially of an aqueous solution having homogeneously dissolved therein a water soluble acidic inorganic aluminum salt and a water soluble quaternized dehydration condensation polymer of triethanolamine or acylated triethanolamine, or mixtures of triethanolamine or acylated triethanolamine, said polymer containing tertiary amino groups of which 20–100% are quaternized, said composition being acidic and having an acidity and a concentration such that said aluminum salt and said polymer remain dissolved in said solution for at least 14 days at temperatures of 40° F. to 110° F.

2. A composition as claimed in claim 1 wherein the pH of the composition is within the range of 2–5.

3. A composition as claimed in claim 1 in which the aluminum salt is aluminum sulfate.

4. A composition as claimed in claim 1 in which the aluminum salt is aluminum chloride.

5. A composition as claimed in claim 1 in which said polymer is quaternized with methyl chloride.

6. A composition as claimed in claim 1 in which said polymer prior to quaternization is a dehydration condensation polymer of triethanolamine and 2–4% by weight of tall oil, said polymer having a viscosity within the range of 44–160 centipoises at 190°–120° C.

7. A composition as claimed in claim 1 containing 10%–20% by weight quaternized polymer and 20%–30% by weight $Al_2(SO_4)_3$.

8. A composition as claimed in claim 1 containing 10%–20% by weight quaternized polymer and 20%–30% by weight $AlCl_3$.

9. A method of processing industrial wastes containing oil-in-water emulsions which have oily water insoluble organic industrial waste materials in a discontinuous phase dispersed in an aqueous continuous phase which comprises adding to said industrial waste an emulsion breaking quantity of a composition as claimed in claim 1, the pH of said industrial waste being higher than the pH of said composition and being such that said aluminum seat comes out of solution when said composition is added to said industrial waste.

10. a method of processing industrial wastes containing oil-in-water emulsions which have oily water insoluble organic industrial waste materials in a discontinuous phase dispersed in an aqueous continuous phase which comprises adding to said industrial waste an emulsion breaking quantity of a composition as claimed in claim 2, the pH of said industrial waste being higher than the pH of said composition and being such that said aluminum salt comes out of solution when said composition is added to said industrial waste.

11. A method of processing industrial wastes containing oil-in-water emulsions which have oily water insoluble organic industrial waste materials in a discontinuous phase dispersed in an aqueous continuous phase which comprises adding to said industrial waste an emulsion breaking quantity of a composition as claimed in claim 3, the pH of said industrial waste being higher than the pH of said composition and being such that said aluminum salt comes out of solution when said composition is added to said industrial waste.

12. A method of processing industrial wastes containing oil-in-water emulsions which have oily water insoluble organic industrial waste materials in a discontinuous phase dispersed in an aqueous continuous phase which comprises adding to said industrial waste an emulsion breaking quantity of a composition as claimed in claim 4, the pH of said industrial waste being higher than the pH of said composition and being such that said aluminum salt comes out of solution when said composition is added to said industrial waste.

13. A method of processing industrial wastes containing oil-in-water emulsions which have oily water insoluble organic industrial waste materials in a discontinuous phase dispersed in an aqueous continuous phase which comprises adding to said industrial waste an emulsion breaking quantity of a composition as claimed in claim 5, the pH of said industrial waste being higher than the pH of said composition and being such that said aluminum salt comes out of solution when said composition is added to said industrial waste.

14. A method of processing industrial wastes containing oil-in-water emulsions which have oily water insoluble organic industrial waste materials in a discontinuous phase dispersed in an aqueous continuous phase which comprises adding to said industrial waste an emulsion breaking quantity of a composition as claimed in claim 6, the pH of said industrial waste being higher than the pH of said composition and being such that said aluminum salt comes out of solution when said composition is added to said industrial waste.

15. A method of processing industrial wastes containing oil-in-water emulsions which have oily water insoluble organic industrial waste materials in a discontinuous phase dispersed in an aqueous continuous phase which comprises adding to said industrial waste an emulsion breaking quantity of a composition as claimed in claim 7, the pH of said industrial waste being higher than the pH of said composition and being such that said aluminum salt comes out of solution when said composition is added to said industrial waste.

16. A method of processing industrial wastes containing oil-in-water emulsions which have oily water insoluble organic industrial waste materials in a discontinuous phase dispersed in an aqueous continuous phase which comprises adding to said industrial waste an emulsion breaking quantity of a composition as claimed in claim 8, the pH of said industrial waste being higher than the pH of said composition and being such that said aluminum salt comes out of solution when said composition is added to said industrial waste.

17. A composition as claimed in claim 1 in which said polymer prior to quaternization has a viscosity within the range of 44–164 centipoises at 190°–120° C. --

18. A method of processing industrial wastes containing oil-in-water emulsions which have oily water insoluble organic industrial waste materials in a discontinuous phase dispersed in an aqueous continuous phase which comprises adding to said industrial waste an emulsion breaking quantity of a composition as claimed in claim 17, the pH of said industrial waste being higher than the pH of said composition and being such that said aluminum salt comes out of solution when said composition is added to said industrial waste.

* * * * *

UNITED STATES PATENT AND TRADEMARK OFFICE
CERTIFICATE OF CORRECTION

PATENT NO. : 4,179,396
DATED : December 18, 1979
INVENTOR(S) : ROBERT K. GABLE et al It is certified that error appears in the above-identified patent and that said Letters Patent are hereby corrected as shown below:

Column 3, line 45, after "2-5" insert --at--.

Column 6, line 24, "seat" should read --salt--.

Signed and Sealed this

Fifteenth Day of April 1980

[SEAL]

Attest:

Attesting Officer

SIDNEY A. DIAMOND
Commissioner of Patents and Trademarks